(12) United States Patent
Halmann (10) Patent No.: US 9,961,833 B2
(45) Date of Patent: *May 8, 2018

(54) CROP DENSITY MAP USING ROW SENSORS

(71) Applicant: Deere & Company, Moline, IL (US)

(72) Inventor: Carlos D. Halmann, Indaiatuba (BR)

(73) Assignee: Deere & Company, Moline, IL (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/091,343

(22) Filed: Apr. 5, 2016

(65) Prior Publication Data

US 2016/0212941 A1    Jul. 28, 2016

Related U.S. Application Data

(63) Continuation of application No. 14/266,906, filed on May 1, 2014, now Pat. No. 9,317,979.

(51) Int. Cl.
| | |
|---|---|
| *A01D 45/10* | (2006.01) |
| *A01D 75/00* | (2006.01) |
| *G07C 5/00* | (2006.01) |
| *G07C 5/08* | (2006.01) |
| *A01D 91/04* | (2006.01) |

(52) U.S. Cl.
CPC ............ *A01D 45/10* (2013.01); *A01D 75/00* (2013.01); *G07C 5/008* (2013.01); *A01D 91/04* (2013.01); *G07C 5/08* (2013.01)

(58) Field of Classification Search
CPC ........... A01D 45/10; A01D 75/00; G07C 5/08
See application file for complete search history.

(56) References Cited

U.S. PATENT DOCUMENTS

| | | | |
|---|---|---|---|
| 6,185,990 B1 * | 2/2001 | Missotten ............ | A01D 41/127 56/10.2 C |
| 6,272,819 B1 * | 8/2001 | Wendte ................ | A01D 41/127 56/10.2 E |
| 6,421,990 B1 * | 7/2002 | Ohlemeyer .......... | A01D 41/127 56/10.2 R |
| 6,508,049 B1 | 1/2003 | Cox et al. | |
| 6,525,276 B1 | 2/2003 | Vellidus et al. | |
| 6,668,223 B2 | 12/2003 | Blackmore et al. | |
| 9,317,979 B2 * | 4/2016 | Halmann ................ | A01D 75/00 |
| 2010/0269470 A1 | 10/2010 | Price | |
| 2014/0236381 A1 * | 8/2014 | Anderson .......... | A01D 41/1271 701/1 |

FOREIGN PATENT DOCUMENTS

| | | | | |
|---|---|---|---|---|
| WO | 2013078328 A2 | 5/2013 | | |
| WO | WO2013078328 A2 * | 5/2013 | ............. | A01D 75/00 |

* cited by examiner

*Primary Examiner* — Dale W Hilgendorf
(74) *Attorney, Agent, or Firm* — Joseph R. Kelly; Kelly, Holt & Christenson, PLLC (57) ABSTRACT

A harvesting system has a harvester that harvests a crop in a crop field. A position component senses a position of the harvester and provides an indication of the sensed position. A crop parameter sensor senses a crop parameter and provides an indication of the sensed crop parameter. A crop gap determination component determines determine a crop gap location, based on the indication of the sensed position and the indication of the sensed crop parameter.

20 Claims, 10 Drawing Sheets

CROP DENSITY MAP USING ROW SENSORS

FILED OF THE DESCRIPTION

The present description relates to ratoon crops. More specifically, the present description relates to generating a map for a ratoon crop.

BACKGROUND

Sugarcane is a tropical grass. Therefore, it is a ratoon crop. As one example, some ratoon crops grow by having new shoots sprout from a plant base so that it can be harvested multiple times, before it is re-planted.

When the sugarcane is planted, or re-planted, portions of mature cane stalk are laid in a furrow in the soil. These portions of stalk are referred to as setts, and they are then covered with soil. Multiple stalks grow from each sett. For instance, in some cases, up to twelve separate stalks grow from one sett. This group of stalks, that grows from a single sett, is referred to as the stool of sugarcane.

Over time, the yield of a given sugarcane field will decrease. This can occur for a variety of reasons. For instance, sugarcane is often harvested using mechanical harvesters. In addition, there are often post-harvesting mechanical operations in which mechanical equipment drives over the harvested sugarcane field. All of these types of operations can cause damage to the field. For example, the setts can be damaged, and the roots of a given stool can be torn from the ground. The yield of a field can decrease over time for other reasons as well.

The discussion above is merely provided for general background information and is not intended to be used as an aid in determining the scope of the claimed subject matter.

SUMMARY

A harvesting system has a harvester that harvests a crop in a crop field. A position component senses a position of the harvester and provides an indication of the sensed position. A crop parameter sensor senses a crop parameter and provides an indication of the sensed crop parameter. A crop gap determination component determines determine a crop gap location, based on the indication of the sensed position and the indication of the sensed crop parameter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed in the background portion, sugarcane plants in a sugarcane field can become damaged over time, which results in the overall yield of the sugarcane field decreasing over time. In some cases, sugarcane is harvested several times before the overall yield decreases to a point where the farmer re-plants the entire field.

Replanting the entire field is quite costly and time consuming. It is less costly to replant only damaged or low yield portions of the field. However, identifying such damaged or low yield portions can be difficult. This is because, while the sugarcane setts are planted in rows, the rows, at harvest time, are often rough and irregular in their shape and spacing. It is therefore difficult to obtain an accurate yield map for a sugarcane field. Without a yield map, it is difficult to locate the low yield portions in the field. Thus, the farmer often simply waits until the overall yield for the entire field decreases to a point where it makes sense to replant the entire field.

Figure 1:
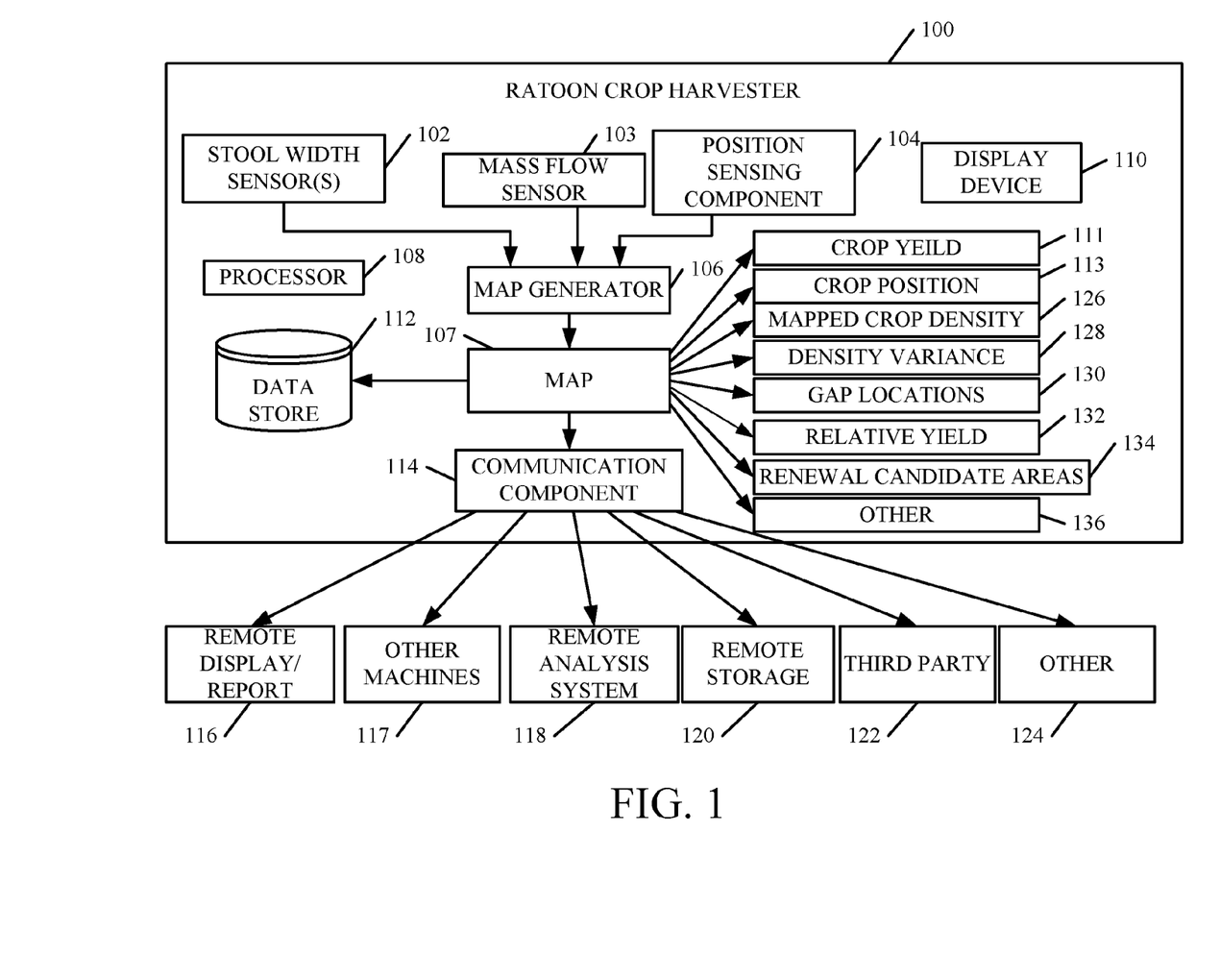
FIG. 1 is a block diagram of one example of a ratoon crop harvester.

FIG. 1 is a block diagram of one illustrative ratoon crop harvester (such as a sugarcane harvester) that generates a stool width map that allows the farmer to identify locations in the sugarcane field that are providing weak production. This enables the sugarcane farmer to identify portions of the field that are good candidates for renewal without renewing or re-planting the entire field. Identifying these renewal candidate areas, and renewing only those areas instead of the entire field, can maintain the overall yield of a sugarcane field, yet reduce the relative number of re-plantings that are performed to maintain that yield. It will also be noted that sugarcane is but one example of a ratoon crop. While the present discussion proceeds with respect to the ratoon crop being sugarcane, it could be other crops as well. For instance, in some environments, rice is grown as a ratoon crop.

FIG. 1 thus shows that ratoon crop harvester 100 illustratively includes a stool width sensor 102, and a position sensing component 104. It can also include a mass flow sensor 103 as well. Harvester 100 also illustratively includes map generator 106 (that generates map 107). Harvester 100 can also include processor 108, display device 110, data store 112 and communication component 114. FIG. 1 shows that, in one embodiment, communication component 114 can communicate with a remote display or reporting device 116, other machines 117, with a remote analysis system 118, with remote storage 120, with third-parties 122, or with other items 124.

Before describing the overall operation of harvester 100 in generating map 107 in detail, a brief overview will be provided. As harvester 100 is traveling through the sugarcane field, stool width sensors 102 sense the width of the stool passing between the crop dividers on harvester 100. Mass flow sensor 103 senses the mass flow rate of harvested crop through harvester 100. Position sensing component 104 senses the position and heading of harvester 100 within the field, and map generator 106 illustratively generates map 107 by correlating the sensed stool width (generated by sensors 102) with the position (generated by component 104) and possibly other inputs.

Map 107 can be a stool width map 109 that maps stool width across the field. This can be generated based on the sensed stool width and the sensed machine position.

Map 107 can also be a yield map 111 that incorporates the inputs from mass flow sensor 103, stool width sensors 102 and position sensing component 104. It can be difficult to map yield based only on an input from mass flow sensor 103 and position sensing component 104. This is because, by the time sensor 103 outputs a mass flow rate signal, harvester 100 has moved from the position where the crop responsible for the signal was harvested. However, by incorporating the stool width sensed by sensors 102, map generator 106 can more accurately estimate the location corresponding to a given mass flow rate. If the mass flow rate is higher, this more likely corresponds to a geographic location where the stool was wider, and vice versa.

In another embodiment, the map 107 can be a crop position map 113. The crop position map 113 can be used, for instance, to control traffic patterns of machines on the field after harvesting. Cane is often cut very close to the ground, and the straw generated from harvesting often covers the field as well. This can make it difficult to see where the rows are before the plants begin to sprout again. It may take several weeks for the plants to sprout. During that time, other machines may be traveling on the field, such as to apply weed control materials, pesticides, or fertilizer, etc. Thus the crop position map 113 can be used to avoid driving on, and damaging, the plants.

The crop position can be calculated by map generator 106 based on a number of things. For instance, map generator 106 can consider the position of crop dividers 162 and 164 relative to the machine (such as from the known machine geometry and the current machine heading) and the crop position relative to the crop dividers 162 and 164 (such as from stool width sensors 102). Using these things, map generator 106 can generate a crop position map 113 that can be used in a variety of different ways, some of which are discussed above.

Map 107 can be stored locally in data store 112, or it can be displayed locally on display device 110. It can include a variety of information as mentioned above, as well as the crop density (indicated, for example, by the stool width) mapped against the various locations within the field from which it was harvested. This is indicated by block 126. It can include a density variance metric that shows how the crop density (or stool width) varies at different locations in the field. This is indicated by block 128. It can identify gap locations (such as where the stool is very thin or non-existent) within the field. This is indicated by block 130. It can provide a relative yield map that indicates a relative yield (which can be calculated or estimated from the sensed stool width) at various locations in the field. This is indicated by block 132. It can also identify renewal candidate areas 134 that indicate where the stool is relatively thin, within the field, and identify these areas as candidate areas for re-planting. Of course, the map 107 can indicate other items 136 as well.

Figure 2:
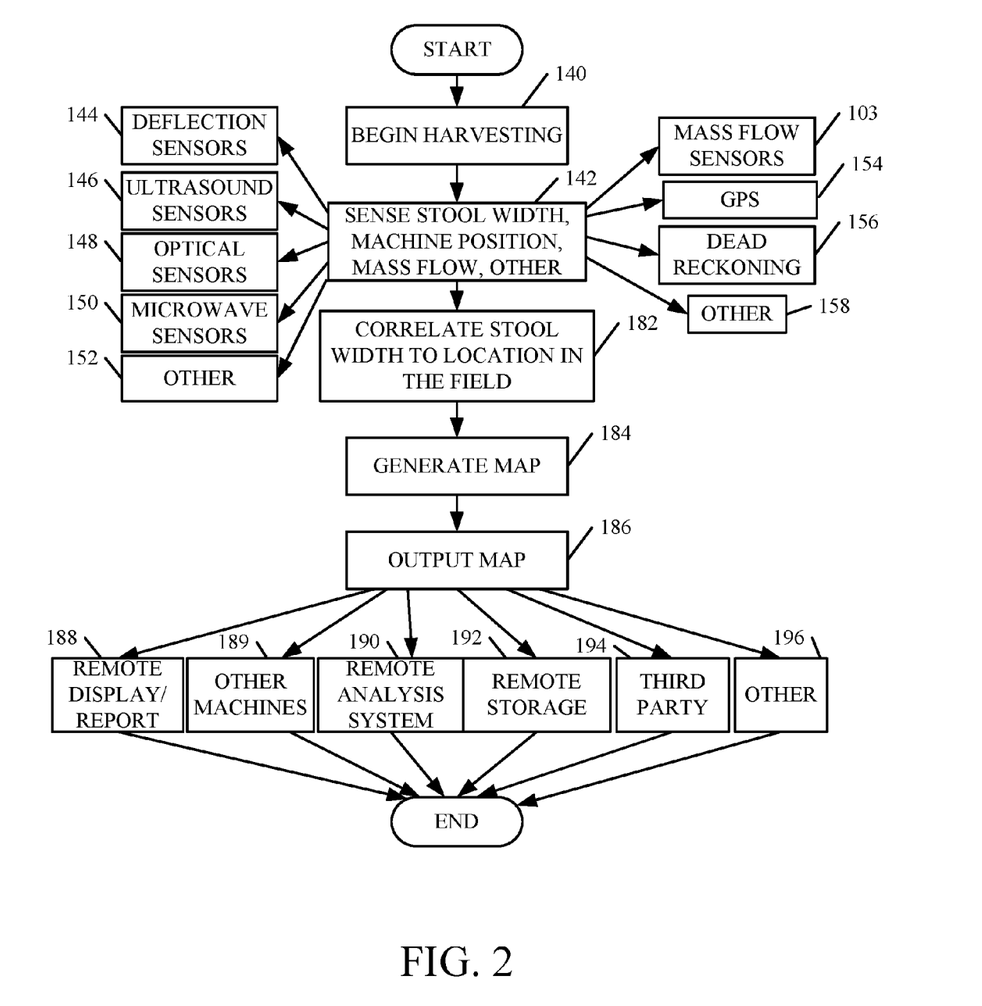
FIG. 2 is a flow diagram illustrating one embodiment of the operation of the harvester shown in FIG. 1 in generating a stool width map.

FIG. 2 is a flow diagram illustrating one embodiment of the operation of harvester 100 in generating map 107, in more detail. The operator first begins harvesting, using harvester 100. This is indicated by block 140 in FIG. 2. Stool width sensors 102 sense the stool width, mass flow sensor 103 senses mass flow through harvester 100, and position sensing component 104 senses the machine position within the field, as the machine moves through the field. This is indicated by block 142.

In one embodiment, the stool width sensors 102 are deflection sensors, as indicated by block 144. They can be other sensors as well, such as ultrasonic sensors 146, optical sensors 148, microwave sensors 150 or other sensors 152. Position sensing component 104 can be a global position system (GPS) sensor 154, a dead reckoning sensor 156, or a wide variety of other sensors 158.

Figure 3:
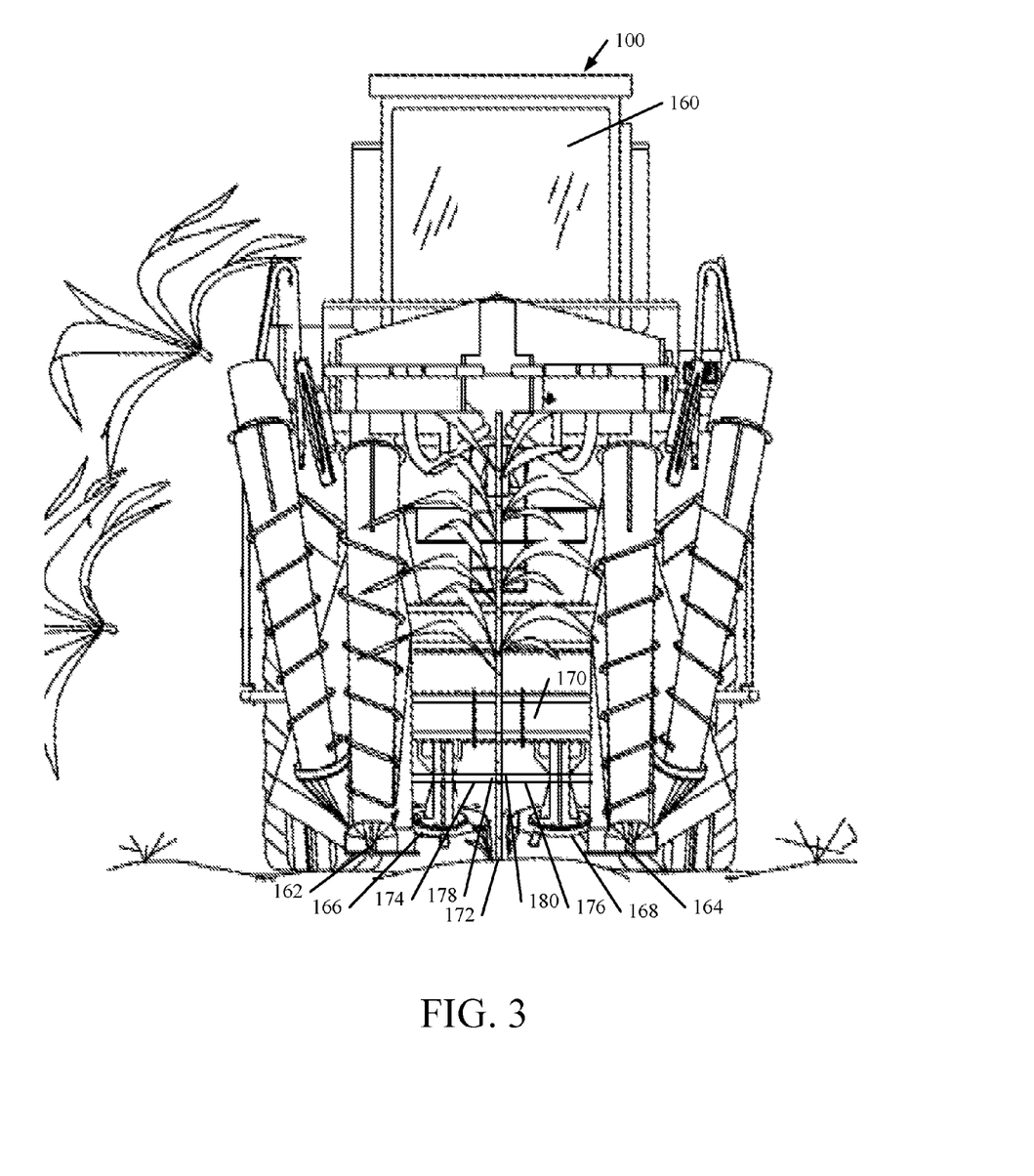
FIGS. 3 and 4 are pictorial illustrations showing one embodiment of a stool width sensor.
Figure 4:
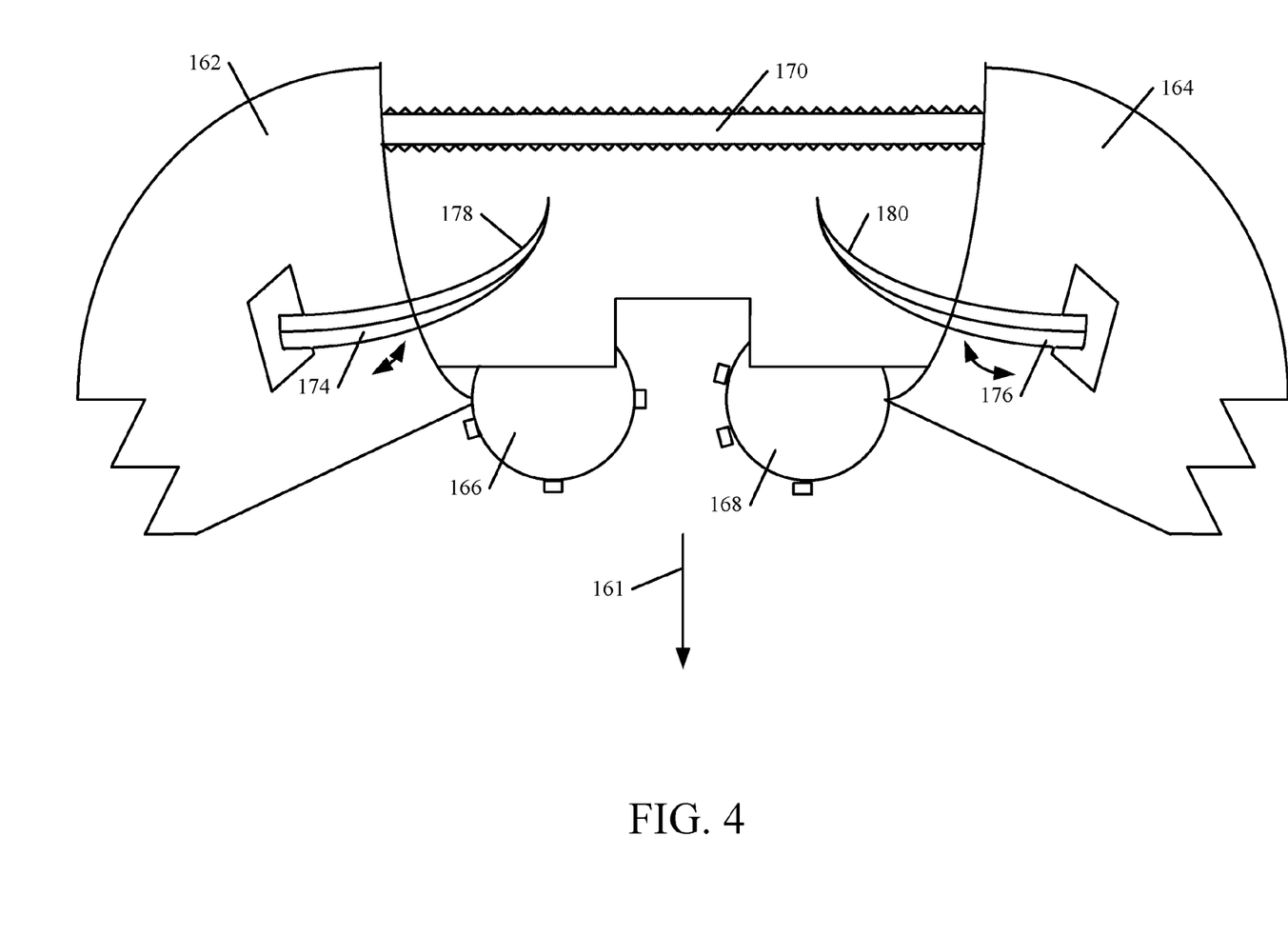

Before continuing with the description of FIG. 2, a more detailed embodiment of stool width sensors 102 will be described. FIGS. 3 and 4 show one embodiment in which stool width sensors 102 are deflection sensors 144. FIG. 3 shows a pictorial front view of harvester 100. It can be seen that harvester 100 illustratively includes an operator's compartment 160 and a pair of crop dividers 162 and 164. It will be noted that in other embodiments there may be a different number of crop dividers. The direction of travel of harvester 100 is illustratively out of the page of FIG. 3. FIG. 4 shows an enlarged view of a front portion of the harvester 100 shown in FIG. 3. The direction of travel is indicated by arrow 161 in FIG. 4. FIGS. 3 and 4 will now be described in conjunction with one another FIGS. 3 and 4 show that harvester 100 illustratively includes a set of base cutters 166 and 168 as well as a knock down roller 170. FIG. 3 shows a stool, generally indicated by arrow 172. FIGS. 3 and 4 also show a set of deflectable arms 174 and 176. They are illustratively biased to a position where they come together, or slightly overlap one another, at their end portions 178 and 180, respectively. Therefore, as the machine moves toward stool 172, the stalks that form the stool deflect the deflectable arms 174 and 176 backwards, in a direction generally toward knockdown roller 170 (or into the page of FIGS. 3 and 4). A set of sensors 102, such as strain gauge sensors, potentiometers, Hall effect sensors or other sensors, sense the extent to which deflectable arms 174 and 176 deflect, as they engage the stool 172. Therefore, if stool 172 has a relatively large number of stalks (and thus a relatively large stool width), then both of the deflectable arms 174 and 176 will deflect rearwardly by a relatively large distance. However, if stool 172 only has a small number of stalks (and thus a relatively small stool width), then deflectable arms 174 and 176 will only deflect a relatively small distance.

Continuing on with the description of FIG. 2, map generator 106 illustratively receives the stool width sensor output signal from sensors 102, the mass flow signal from sensor 103, and the position signal from position sensing component 104. Map generator 106 then illustratively correlates the measured or sensed stool width to the location of harvester 100, within the field, as output by component 104. This is indicated by block 182 in the flow diagram of FIG. 2.

Based upon the correlation of the stool width and the location, map generator 106 illustratively generates map 107. Generating the map 107 is indicated by block 184 in FIG. 2. The map 107 can be generated based on other inputs as well, such as the mass flow. Map generator 106 outputs map 107, as indicated by block 186.

As briefly mentioned above, map 107 can be output to a wide variety of different places, and it can be used in a wide variety of different ways. For instance, it can be displayed locally on display device 110 of machine 100, or it can be displayed remotely at a remote display device or report generator 116. Displaying either locally or remotely, or generating reports from the information on map 107, is indicated by block 188 in the flow diagram of FIG. 2.

It can also be downloaded to other machines as a crop position map so the other machines can avoid driving over, and hence damaging, the crop. This is indicated by block 189 in FIG. 2.

Map 107 can also be subjected to further analysis. For instance, it can be stored in data store 112 on machine 100 and analyzed by processor 108, in order to obtain the crop yield 111, crop position 113, mapped crop density 126, the density variants 128, the gap locations 130, the relative yield 132, the renewal candidate areas 134 or other information 136. Of course, it can also be provided to remote analysis system 118, where that type of analysis can be performed remotely. Outputting the map 107 for remote or local analysis is indicated by block 190 in the flow diagram of FIG. 2.

It can be stored locally on data store 112 or output to remote storage 120. Outputting it for either remote or local storage is indicated by block 192.

It can also be output to third-parties 122. This is indicated by block 194 in FIG. 2. By way of example, it can be output to an agronomist for further analysis. It can also be output to a fertilizer company or a pesticide company. It can be output to a machine manufacturer company for further analysis, or storage, or for historical analysis to indicate where gaps evolve over the years. It can be output to a farm manager, various other vendors, manufacturers, or other companies, so that they can identify the needs of this particular farmer (such as how many additional setts are needed, how much additional fertilizer is needed, etc.). Of course, the map can be used in other ways as well, and this is indicated by block 196 in the flow diagram of FIG. 2.

It can thus be seen that the system shown in FIG. 1 can be used to generate the map 107 or a wide variety of other information, such as, yield 111, crop position 113, mapped crop density 126 or other information. This information can be used by a sugarcane farmer to accurately identify the parts of a sugarcane field that need to be re-planted. The farmer can thus maintain the overall yield of the given field, without needing to replant the entire field as often as would otherwise be needed.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 5:
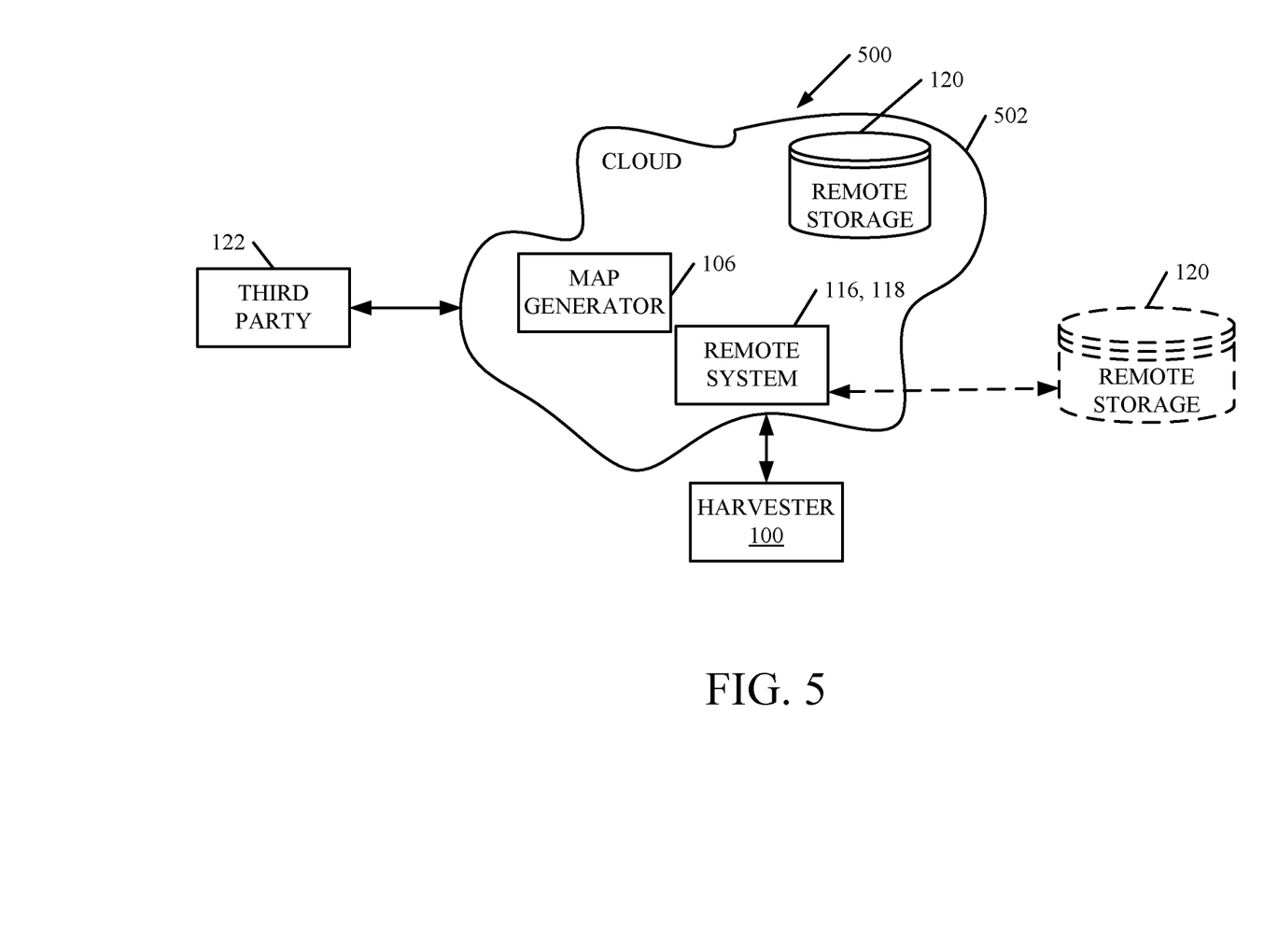
FIG. 5 is a block diagram of the harvester deployed in one example of a remote server configuration.

FIG. 5 is a block diagram of harvester 100, shown in FIG. 1, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 5, some items are similar to those shown in FIG. 1 and they are similarly numbered. FIG. 5 specifically shows that map generator 106, systems 116 and 118 and storage 120 can be located at a remote server location 502. Therefore, harvester 100 accesses those systems through remote server location 502.

FIG. 5 also depicts another embodiment of a remote server architecture. FIG. 5 shows that it is also contemplated that some elements of FIG. 1 are disposed at remote server location 502 while others are not. By way of example, remote storage 120 or third party system 122 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
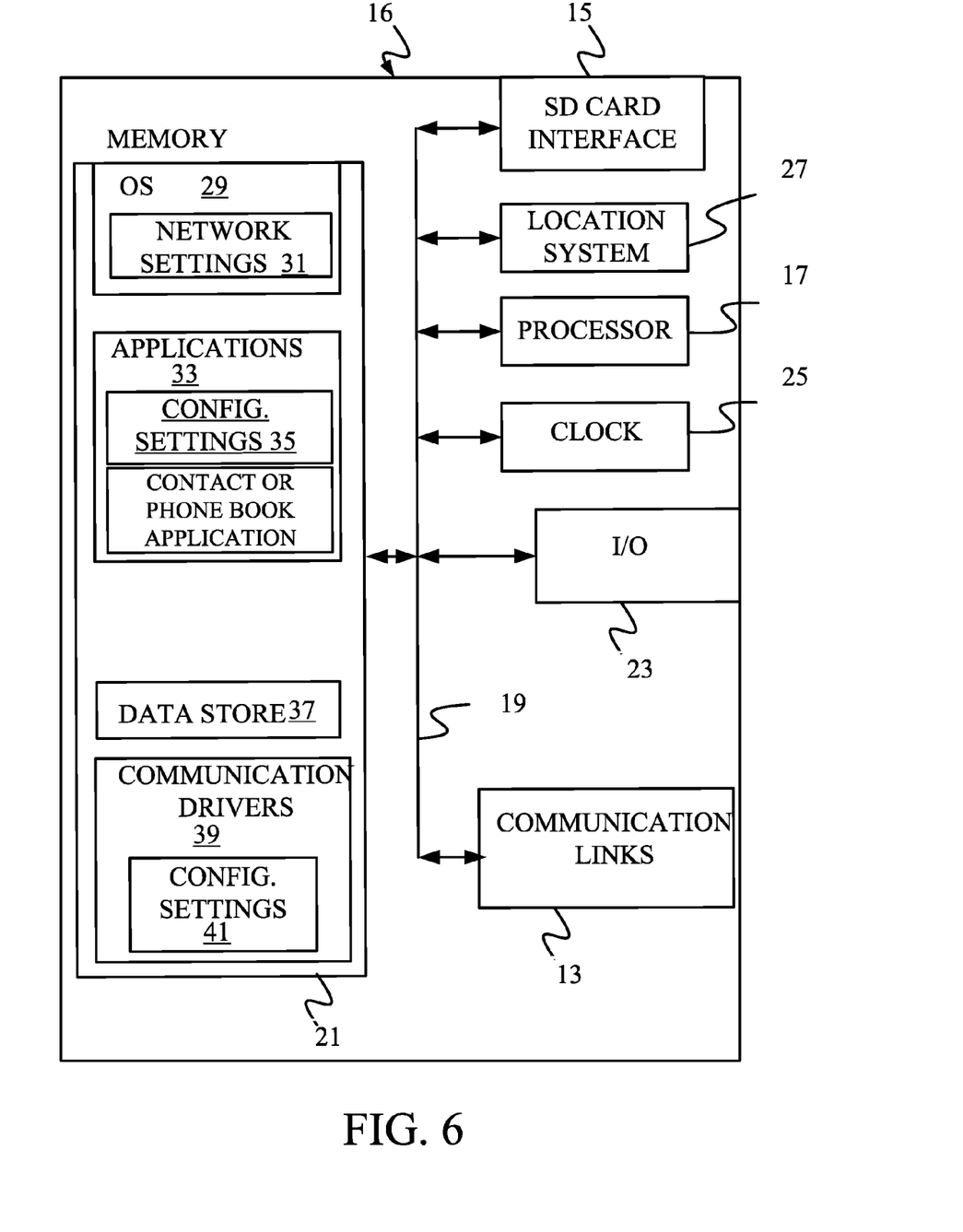
FIGS. 6-9 are examples of mobile devices.
Figure 7:
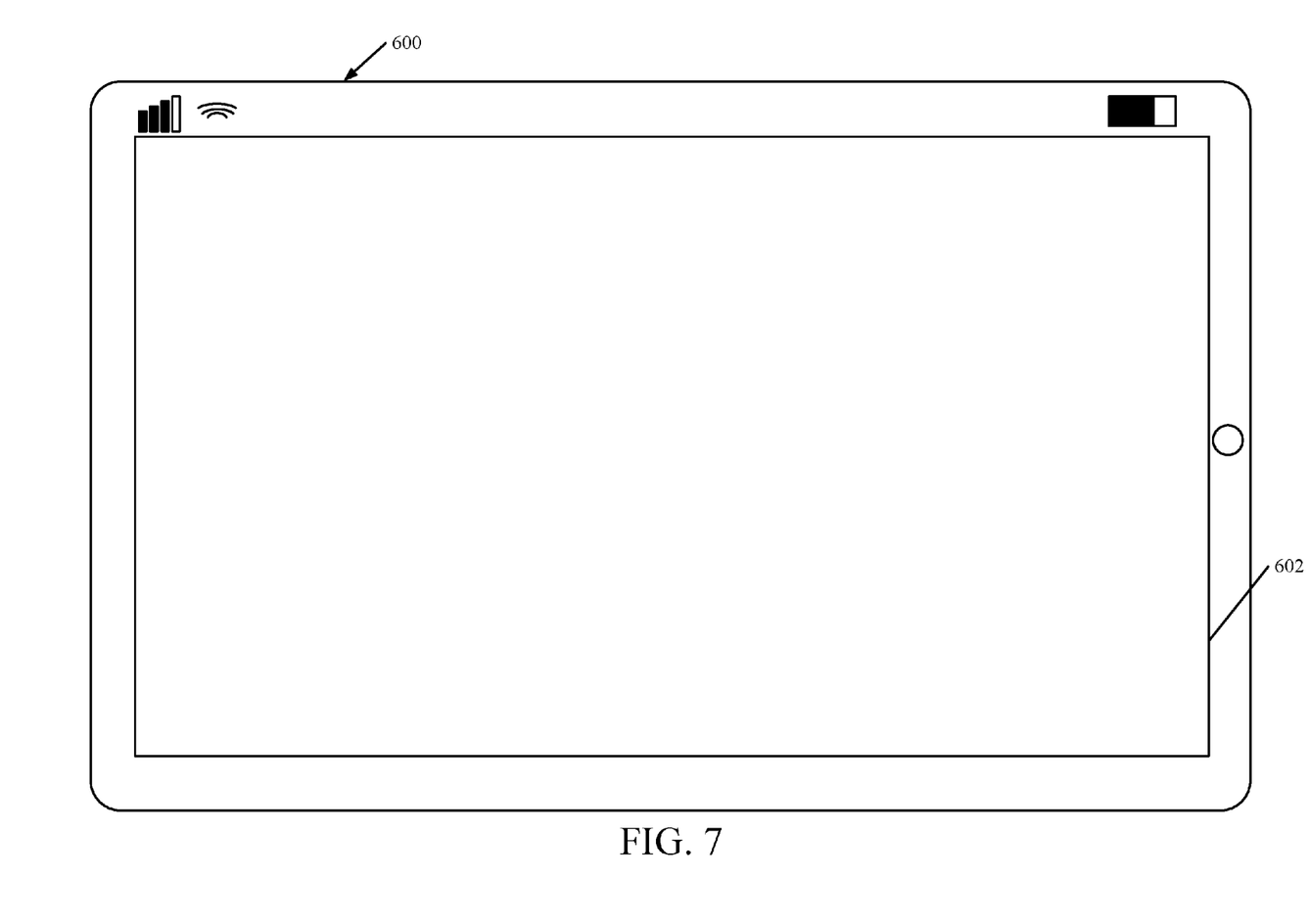
Figure 8:
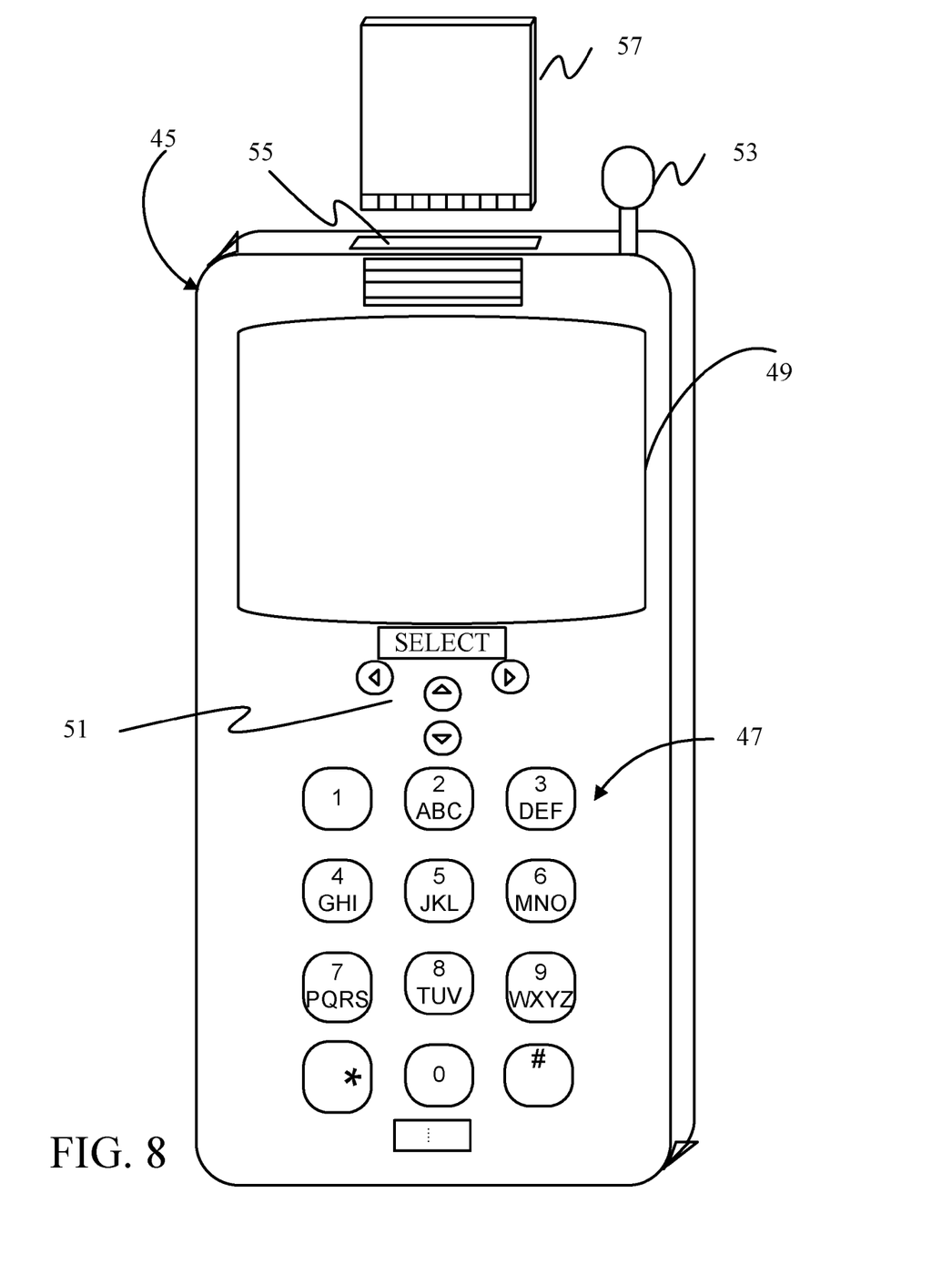
Figure 9:
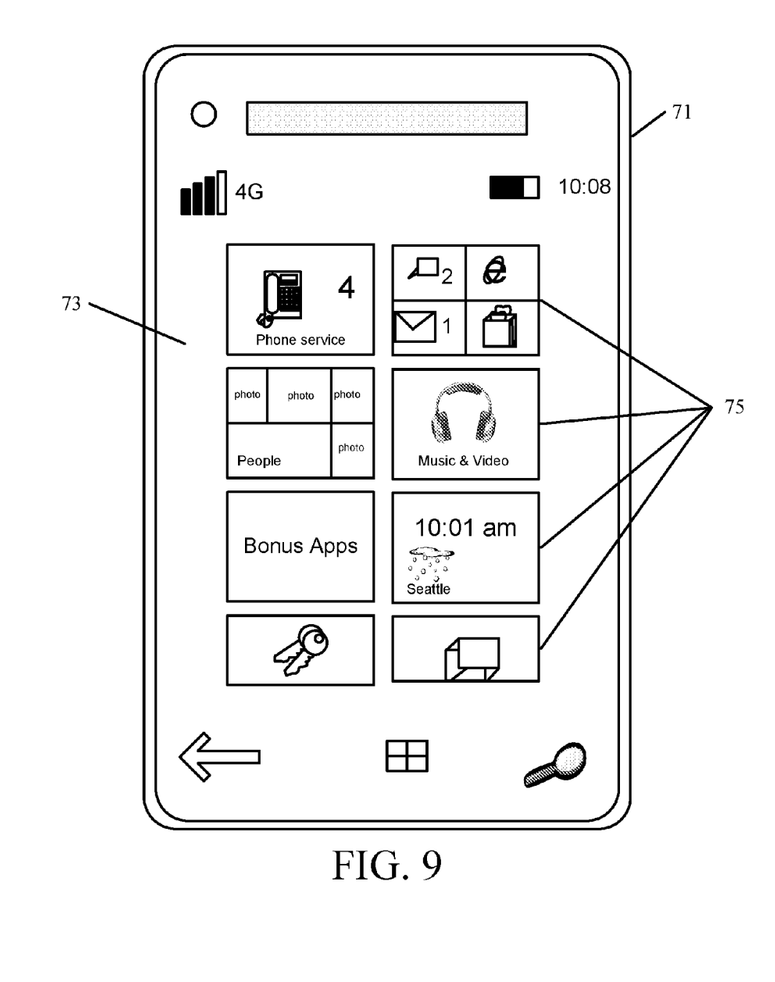

FIG. 6 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communication links 13 communicate with a processor 17 (which can also embody processor 108 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one embodiment in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 provides an additional example of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals. In some embodiments, phone 45 also includes a Secure Digital (SD) card slot 55 that accepts a SD card 57.

FIG. 9 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
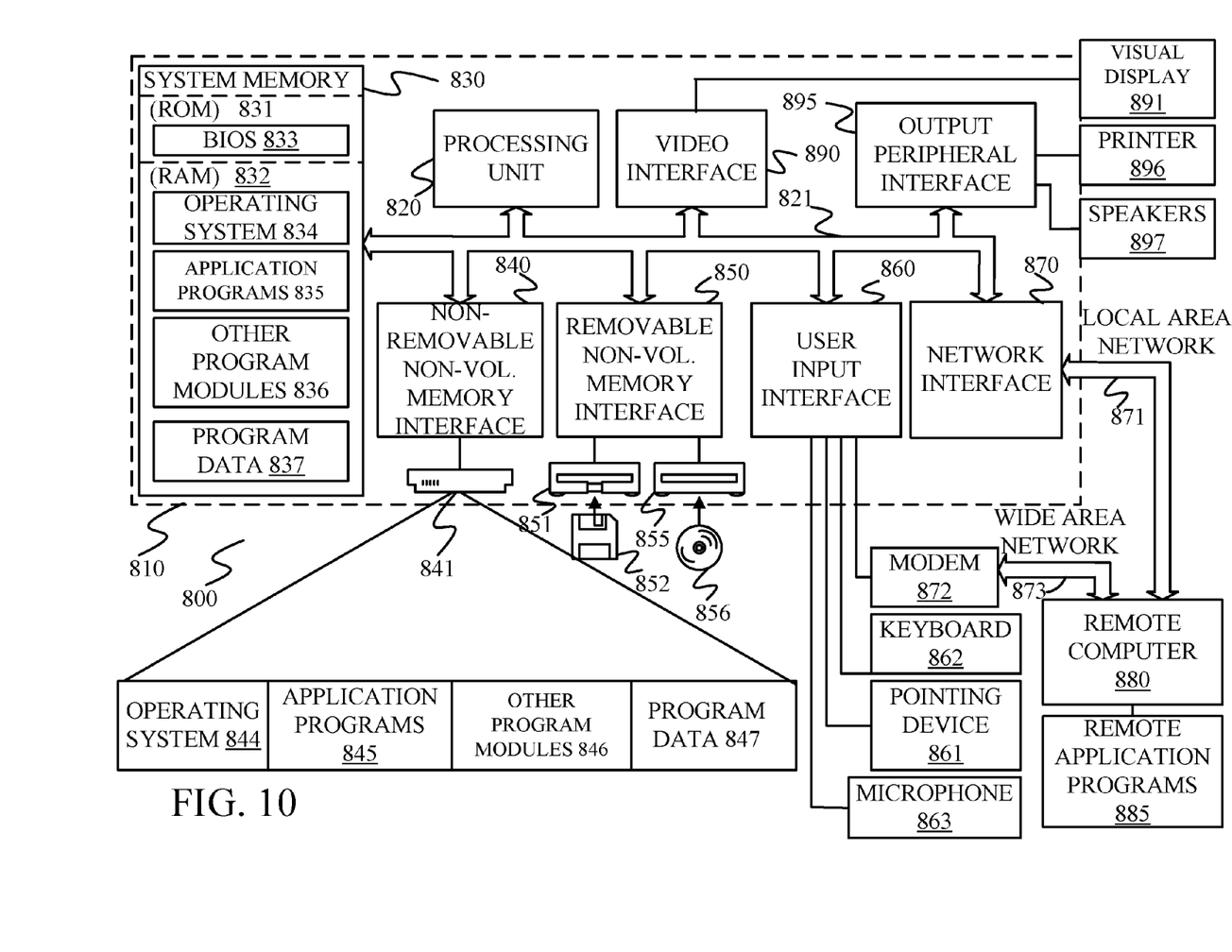
FIG. 10 is a block diagram of one exemplary computing environment.

FIG. 10 is one embodiment of a computing environment in which elements of FIG. 1, or parts of it, (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processor 108), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A harvest comprising;
   a harvester that harvests a crop in a crop field;
   a position sensor that senses a position of the harvester and provides an indication of the sensed position;
   a crop divider that engages the crop in the field during harvesting;
   a stool width sensor that senses a stool width of the crop in the field when the crop divider engages the crop and provides an indication of the sensed stool width of the crop; and
   a map generator that determines a crop gap location based on the indication of the sensed position and the indication of the sensed stool width of the crop.

2. The harvesting system of claim 1 wherein the stool width sensor comprises:
   an optical sensor that senses an optical reflectance of the crop, the optical reflectance being indicative of the stool width of the crop in the field.

3. The harvesting system of claim 1, wherein the stool width sensor comprises:
   an ultrasound sensor configured to sense the stool width of the crop in the field.

4. The harvesting system of claim 1, wherein the stool width sensor comprises:
   a microwave sensor configured to sense the stool width of the crop in the field.

5. The harvesting system of claim 1, wherein the map generator identifies the crop gap location as a correlation between the sensed stool width of the crop and the sensed position.

6. The harvesting system of claim 5, wherein the map generator calculates a crop density of the crop and generates a visual map that depicts an indication of the crop density throughout the crop field.

7. The harvesting system of claim 1, wherein the map generator is configured to determine the crop gap location as a correlation between the sensed stool width of the crop in the field and the sensed position, and generate a visual map that indicates renewal candidate areas in the crop field, based on the determined crop gap location.

8. The harvesting system of claim 1, wherein the map generator calculates an estimated crop yield for the crop field, based on the indication of the sensed position and the indication of the sensed stool width of the crop in the field.

9. The harvesting system of claim 8, wherein the map generator generates a visual map that shows relative crop yield throughout the crop field, based on the calculated estimated crop yield.

10. The harvesting system of claim 1, further comprising:
a crop mass component that senses a mass of the crop and provides a mass signal indicative of the sensed mass.

11. The harvesting system of claim 10, wherein the map generator calculates a correlation between the indication of the sensed position and the sensed stool width of the crop with the sensed mass.

12. The harvesting system of claim 11, wherein the map generator generates a visual map that indicates a position of the crop gap location throughout the crop field, based on the calculated correlation.

13. The harvesting system of claim 1, wherein the crop divider comprises at least one deflectable arm that contacts the crop in the field during harvesting.

14. The harvesting system of claim 13, wherein the crop divider is coupled to a knockdown roller, and wherein the deflectable arm is deflected, as the arm contacts the crop in the field, toward the knockdown roller, to a distance that varies as the crop stool width varies.

15. A method of harvesting a crop in a field, comprising:
sensing a stool width of the crop in the field when a portion of a crop harvester engages the crop in the field as the crop harvester moves through the field;
sensing a harvester position in the field;
calculating a correlation between the sensed stool width of the crop and the sensed harvester position;
based on the calculated correlation, identifying a crop gap location in the field; and
outputting the identified crop gap location.

16. The method of claim 15, wherein sensing the harvester position comprises:
receiving a position signal indicative of a geographic location of the harvester.

17. The method of claim 15, wherein sensing the stool width of the crop in the field comprises sensing a distance that the portion of the crop harvester deflects when the portion contacts the crop in the field during harvesting.

18. The method of claim 15, wherein identifying the crop gap location comprises:
calculating a subsequent correlation between a sensed mass flow rate, of the crop through the harvester, and the sensed harvester position in the field; and
based on the calculated subsequent correlation, determining a metric indicative of crop density throughout the field.

19. The method of claim 15, wherein outputting the identified crop gap location comprises generating a visual map that identities the crop gap location in the field.

20. A method of determining a crop gap location in a ratoon crop field, comprising:
sensing a position of a harvester as the harvester travels over the ratoon crop field during harvesting;
measuring a mass flow rate of a crop through the harvester;
calculating a correlation between the measured mass flow rate and the sensed position of the harvester;
sensing a stool width of the crop in the ratoon crop field;
determining the crop gap location based on the sensed stool width of the crop and the correlated mass flow rate and the sensed position; and
calculating a relative yield throughout the ratoon crop field based on the determined crop gap location.

* * * * *